(No Model.)
W. H. PRATT.
DISTANCE AND ALTITUDE INSTRUMENT.
No. 508,556. Patented Nov. 14, 1893.
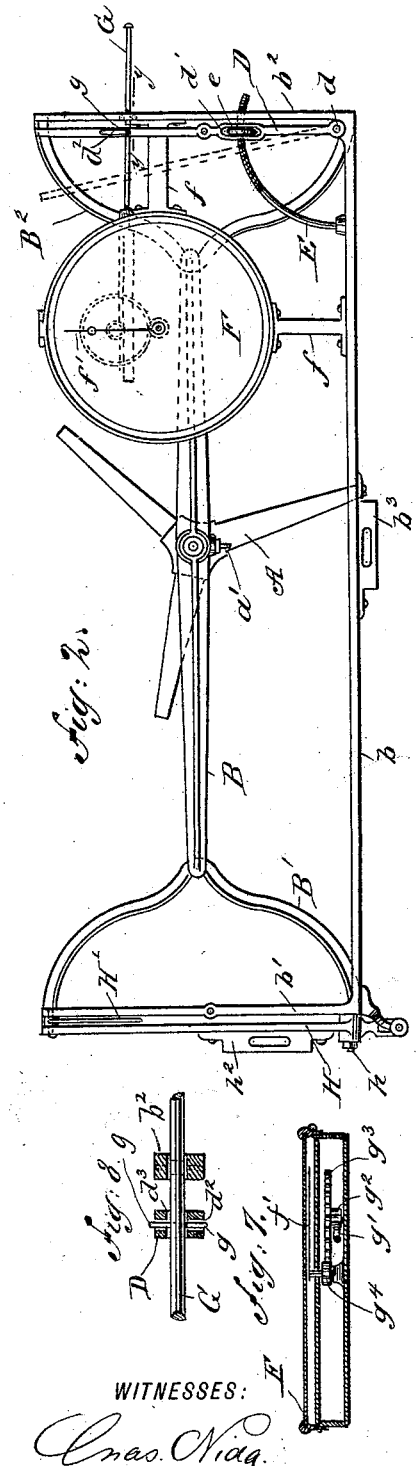
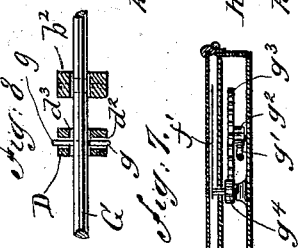
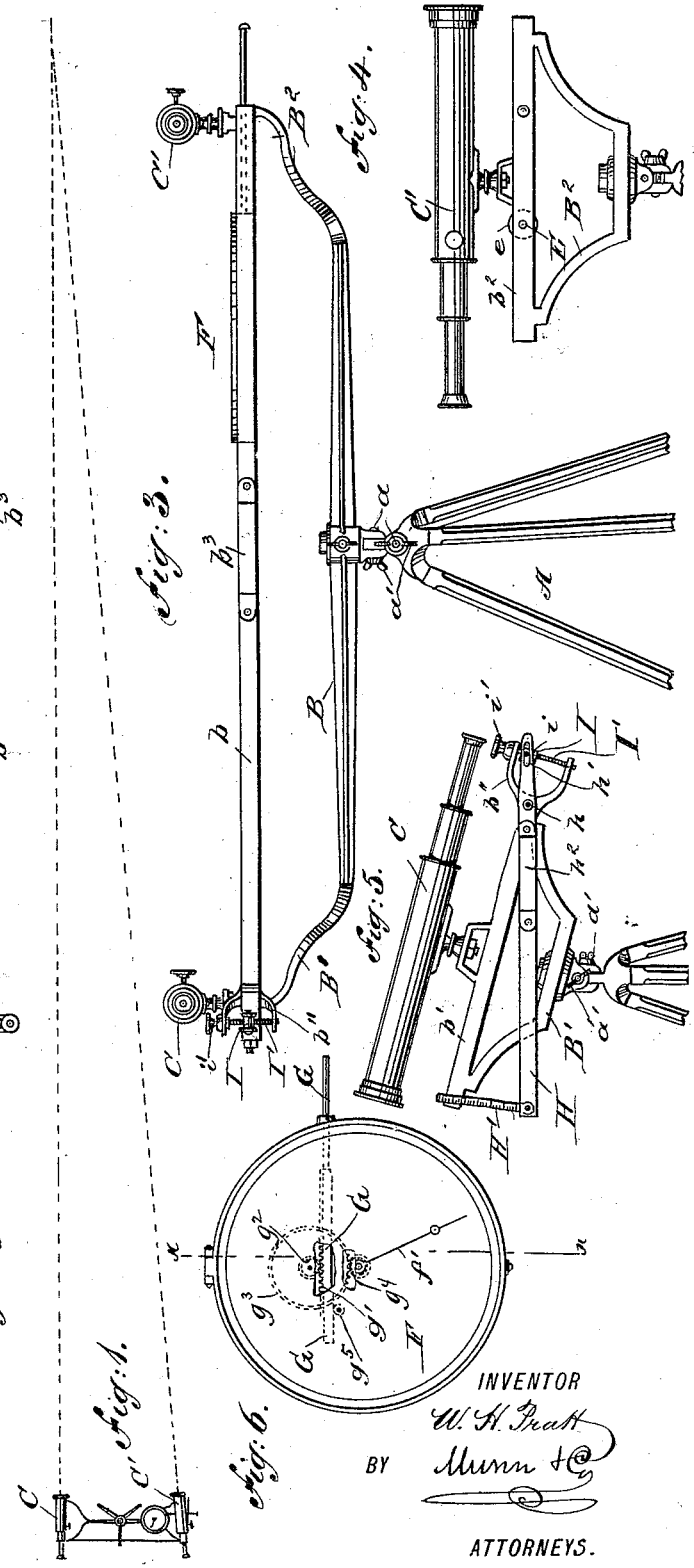
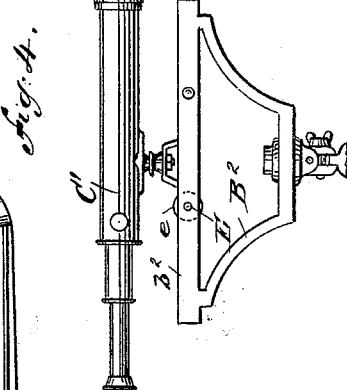
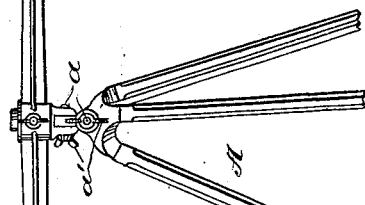
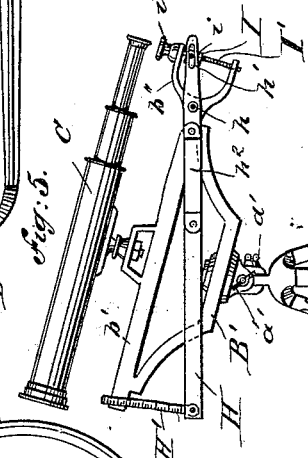
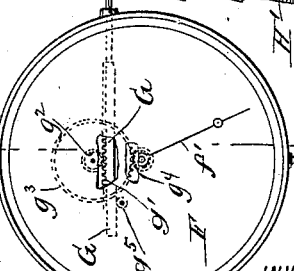
WITNESSES:
Chas. Nida.
C. Sedgwick.
INVENTOR
W. H. Pratt
BY Munn & Co.
ATTORNEYS.
THE NATIONAL LITHOGRAPHING COMPANY,
WASHINGTON, D. C.

UNITED STATES PATENT OFFICE.

WILLIS H. PRATT, OF STILLWATER, MINNESOTA.

DISTANCE AND ALTITUDE INSTRUMENT.

SPECIFICATION forming part of Letters Patent No. 508,556, dated November 14, 1893.

Application filed March 12, 1889. Renewed April 15, 1893. Serial No. 470,542. (No model.)

*To all whom it may concern:*

Be it known that I, WILLIS H. PRATT, of Stillwater, in the county of Washington and State of Minnesota, have invented a new and Improved Instrument for Measuring Distances and Altitudes, of which the following is a full, clear, and exact description.

The object of the invention is to furnish an instrument for engineers, for use in readily and accurately determining distances and altitudes, and to this end the invention consists in the novel construction and combination of parts as hereinafter particularly described and defined in the claims.

Reference is to be had to the accompanying drawings forming a part of this specification, in which similar letters of reference indicate corresponding parts in all the figures.

Figure 1 is a plan view of my new and improved instrument showing the relative positions of the telescopes in ascertaining distances with the instrument. Fig. 2 is a plan view of the instrument with the telescopes thereof removed. Fig. 3 is a front or side elevation. Figs. 4 and 5 are end elevations. Fig. 6 is a plan view of the registering dial, partly broken away to show the devices for operating the pointer. Fig. 7 is a sectional view through the dial on line $x$—$x$ Fig. 6; and Fig. 8 is a vertical section on line $y$—$y$ Fig. 2.

Referring to the parts, on a tripod A, the frame of the instrument is mounted, which comprises a longitudinal bar B, that rigidly supports, by its upwardly and outwardly diverging end arms B′, B², the three-sided frame $b$, $b'$, $b^2$, the longitudinal bar or member $b$, of which, is provided with a spirit level $b^3$, and extends at right angles to the transverse end bars $b'$, $b^2$ and ranges parallel with the bar B. The bar B has a gimbal connection with the tripod A, by means of the pivots $a$ $a$, that are arranged at right angles to each other and carry wing nuts $a'$, $a'$, or equivalent means for binding the instrument in the given position.

The frame $b$, $b'$, $b^2$, while rigidly fixed to the bar B, while the instrument is in use, will, in practice, be removable therefrom for convenience in packing.

The end bar $b'$, is surmounted by a telescope C, lying parallel therewith, and at the opposite end of the frame is a second telescope C′, that is mounted on a supporting bar D, which bar is pivoted on a vertical pivot $d$, at the juncture of the bars $b$, $b^2$, of the frame. A distance from its pivoted end the bar D is vertically slotted as at $d'$, to receive a nut $e$, that rides in said slot on a threaded segmental rod or arm E which is fixed to the bar $b$, the turning of which nut $e$ moves the bar D, on its pivot and with it the telescope C′.

Mounted in the frame of the instrument, as by braces $f, f$, is a registering dial F, whose pointer $f'$ is caused to be rotated by the movement of the supporting bar D of telescope C′, by any suitable intermediate connections. In the construction shown, the bar D is formed with a vertical slot $d^2$, and an intersecting horizontal slot $d^3$ (Fig. 8) and in the slot $d^3$ rests a sliding bar G, from which there project into vertical slot $d^2$ the pins $g$, by means of which the said bar G is given a sliding movement by bar D. The inner end of bar G is formed with a rack whose teeth $g'$, mesh with a pinion $g^2$, on the hub of a gear wheel $g^3$, which in turn meshes with a pinion $g^4$, on the pivot of the pointer $f'$, of dial F. The rack bar G has an additional support at its outer end in the bar $b^2$, and is guided at its inner end by a friction roller $g^5$ (Fig. 6).

At the end of the instrument on which the telescope C is mounted, there is pivoted to bar $b'$, for vertical movement thereon, as at $h$, a bar H, the projecting end of which is formed with an elongated slot $h'$, into which projects a pin $i$, on a traveler I which travels vertically on a threaded spindle I′, the said spindle being supported in the forked bracket $b''$ on the bar $b'$, and provided with a head $i'$. On the free end of bar H is provided a graduated slide H′.

In operation, the instrument is adjusted on the pivots $a$, $a$, to sight the object through telescope C, and fixed in such position. Then, by means of the nut $e$, the telescope C′ is also brought to bear on the object, and in the turning of the telescope C′, its supporting bar D rotates the pointer of the dial, through the intermediate mechanism above described, whereby the dial indicates the distance of the object, as the lines of sight from telescope C, C′, form respectively the perpendicular and hypotenuse of a right angle triangle whose base is a line drawn through the pivot of telescope C', and the rear of telescope C, and the greater the distance of the point of convergence of the respective lines of sight, the greater the angle formed by the base and hypotenuse of the triangle, and in accordance with which the multiplying gear in practice, may be readily arranged to indicate the distance of the object (the point of convergence of the lines of sight from the respective telescopes).

In determining altitudes, at either short or long distances, the distance to the top of the elevation, whose height it is desired to determine is first ascertained in the manner above specified, which distance gives the hypotenuse of a right-angle triangle, the height of the object being the perpendicular. The spindle I' is then manipulated to raise the end of the bar H to which it is connected and depress its free end until the spirit level $h^2$ thereon shows the said bar to be in a horizontal position. Thus the bar H, its slide H', and the bar $b'$, of the frame, form a triangular figure of which the graduated slide H' represents the exact perpendicular, and whose known hypotenuse is represented by the bar $b'$, and the triangle thus formed corresponds to that whose perpendicular is represented by the height of the elevation that it is desired to determine. Thus, for example, suppose the distance to the point of the elevation is ascertained (by dial F) to be one mile—five thousand two hundred and eighty feet—and suppose the frame bar $b'$ (known hypotenuse) to be one and one-half feet, and suppose the slide H' (known perpendicular) to indicate one-twelfth foot, we have the ratio $1\frac{1}{2}:5280::\frac{1}{12}:x$, or two hundred and ninety-three and one-third feet. It will thus be seen that by the use of the above described instrument, distances and altitudes, may be very readily determined.

Having thus described my invention, what I claim as new, and desire to secure by Letters Patent, is—

1. In a surveying instrument, in combination with a suitable frame and the fixed sighting device thereon, the movable sighting device mounted on the frame, so as to be capable of being swung to stand at different angles with relation to the fixed device, a rod connected with the movable sighting device, so as to be moved thereby, the graduated dial, the pointer swung over the same, and gearing connecting the pointer with the rod, substantially as and for the purpose described.

2. In a surveying instrument, in combination with a suitable frame, the fixed and movable sighting devices thereon, the latter of which is mounted so as to be capable of being swung to any desired angle with reference to the other, the rod connected with the movable device, the pointer, gearing connecting the latter with the rod, and a dial over which the pointer moves graduated so as to indicate the distance of the points at which the line of sight of the movable sighting device will intersect that of the fixed device as the movable device is swung to different angles, substantially as and for the purpose described.

3. In a surveying instrument, in combination with a suitable frame and the fixed sighting device thereon, the hinged bar provided with a slot, the sighting device on the bar, the rod having a pin engaging the slot in the bar, the dial, the pointer and gearing connecting the latter with the rod, so that it will be swung as the rod is moved, substantially as and for the purpose described.

4. In a surveying instrument, in combination with a suitable frame and the fixed sighting device thereon, the swinging bar slotted longitudinally, the sighting device thereon, the rod provided with a pin engaging the slot in the bar, and an indicator actuated by the bar, adapted to indicate the distance of the point at which the line of sight of the device on the bar will intersect that of the fixed sighting device, as the device on the swinging bar is moved to stand at any angle to the fixed device, substantially as and for the purpose described.

5. In a surveying instrument, in combination with a suitable frame, the bar for supporting a sighting device, pivoted to the frame, a curved, threaded rod attached to the frame, a rotary piece tapped on such rod, and connections between such piece and the pivoted or hinged bar, whereby the latter is caused to travel with it as it travels along the threaded rod, substantially as and for the purpose described.

6. In a surveying instrument, in combination with the frame and the fixed sighting device thereon, the bar pivoted to the frame and provided with a longitudinal slot, the sighting device on the bar, the curved threaded rod attached to the frame, a rotary piece tapped upon such rod, connections between the pivoted bar and such piece to cause them to move together, a rod having a pin engaging the slot in the pivoted bar, teeth on the rod, the pointer, the gearing for rotating the same, and the graduated dial, substantially as and for the purpose described.

7. In a surveying instrument, in combination with the tilting frame, carrying the sighting devices, the bar hinged thereto, a leveling device on the bar to indicate when it is level, and means for indicating the angle between the bar and frame, substantially as and for the purpose set forth.

8. In a surveying instrument, in combination with the tilting frame carrying the sighting devices, the bar hinged thereto, so as to swing in a vertical plane, means on the bar for indicating when it is level, and the graduated slide hinged to the bar, substantially as and for the purpose described.

9. In a surveying instrument, in combination with the tilting frame, the bar hinged thereto carrying a leveling device, a screw on the frame, a threaded block or piece on the screw, connections between the same and the bar, and means for indicating the angle of the frame with reference to the bar, substantially as and for the purpose described.

10. In a surveying instrument, in combination with a suitable support, and the tilting frame thereon, the fixed and movable sighting devices mounted on the frame, so that the movable device can be swung toward or from the fixed one, the indicating mechanism connected with and actuated by the movable device as it is swung, a bar hinged to the frame, having means to indicate when the bar is level, and an angle measuring device adapted to measure the angle of the plane of the lines of sight of the sighting devices with reference to the bar, substantially as and for the purpose described.

WILLIS H. PRATT.

Witnesses:
E. G. BUTTS,
T. C. CLARK.